US010626306B2

(12) United States Patent
Goletto

(10) Patent No.: US 10,626,306 B2
(45) Date of Patent: Apr. 21, 2020

(54) HIGH-PERFORMANCE THERMAL INSULATION PRODUCTS

(71) Applicant: SAINT-GOBAIN ISOVER, Courbevoie (FR)

(72) Inventor: Valerie Goletto, Maisons-Alfort (FR)

(73) Assignee: Saint-Gobain Isover, Courbevoie (FR)

(*) Notice: Subject to any disclaimer, the term of this patent is extended or adjusted under 35 U.S.C. 154(b) by 232 days.

(21) Appl. No.: 15/536,316

(22) PCT Filed: Dec. 14, 2015

(86) PCT No.: PCT/FR2015/053490
§ 371 (c)(1),
(2) Date: Jun. 15, 2017

(87) PCT Pub. No.: WO2016/097567
PCT Pub. Date: Jun. 23, 2016

(65) Prior Publication Data
US 2018/0044561 A1    Feb. 15, 2018

(30) Foreign Application Priority Data

Dec. 17, 2014  (FR) ..................... 14 62638

(51) Int. Cl.
| | | |
|---|---|---|
| *C09J 131/04* | (2006.01) | |
| *E04B 1/78* | (2006.01) | |
| *E04B 1/76* | (2006.01) | |
| *B32B 9/00* | (2006.01) | |
| *B32B 9/04* | (2006.01) | |
| *B32B 7/12* | (2006.01) | |
| *B32B 5/26* | (2006.01) | |
| *F16L 59/06* | (2006.01) | |
| *F16L 59/04* | (2006.01) | |
| *B32B 5/02* | (2006.01) | |
| *C04B 30/02* | (2006.01) | |
| *E04B 1/80* | (2006.01) | |
| *F16L 59/02* | (2006.01) | |
| *E04F 15/20* | (2006.01) | |
| *E04B 1/74* | (2006.01) | |
| *E04F 13/04* | (2006.01) | |
| *C04B 111/00* | (2006.01) | |

(52) U.S. Cl.
CPC ............. *C09J 131/04* (2013.01); *B32B 5/022* (2013.01); *B32B 5/26* (2013.01); *B32B 7/12* (2013.01); *B32B 9/00* (2013.01); *B32B 9/04* (2013.01); *C04B 30/02* (2013.01); *E04B 1/78* (2013.01); *E04B 1/806* (2013.01); *B32B 2255/02* (2013.01); *B32B 2255/26* (2013.01); *B32B 2260/023* (2013.01); *B32B 2260/04* (2013.01); *B32B 2260/046* (2013.01); *B32B 2262/0284* (2013.01); *B32B 2262/10* (2013.01); *B32B 2262/101* (2013.01); *B32B 2262/105* (2013.01); *B32B 2262/108* (2013.01); *B32B 2264/0228* (2013.01); *B32B 2264/0292* (2013.01); *B32B 2264/102* (2013.01); *B32B 2307/304* (2013.01); *B32B 2307/3065* (2013.01); *B32B 2307/5825* (2013.01); *B32B 2307/718* (2013.01); *B32B 2307/72* (2013.01); *B32B 2307/724* (2013.01); *B32B 2307/732* (2013.01); *B32B 2419/00* (2013.01); *C04B 2111/00612* (2013.01); *E04B 2001/742* (2013.01); *E04F 13/04* (2013.01); *E04F 15/203* (2013.01); *F16L 59/029* (2013.01); *F16L 59/04* (2013.01); *F16L 59/06* (2013.01)

(58) Field of Classification Search
None
See application file for complete search history.

(56) References Cited

U.S. PATENT DOCUMENTS

| | | |
|---|---|---|
| 9,370,915 B2 † | 6/2016 | Sandler |
| 2002/0025427 A1 | 2/2002 | Schwertfeger et al. |
| 2002/0094426 A1 | 7/2002 | Stepanian et al. |
| 2006/0125158 A1 | 6/2006 | Rouanet et al. |
| 2006/0199455 A1 | 9/2006 | Stepanian et al. |
| 2009/0229032 A1 | 9/2009 | Stepanian et al. |
| 2010/0140840 A1 | 6/2010 | Rouanet et al. |
| 2012/0097907 A1 | 4/2012 | Bauer et al. |
| 2013/0171900 A1 | 7/2013 | Bauer et al. |
| 2014/0004290 A1* | 1/2014 | Kim ............... F16L 59/029 428/71 |
| 2014/0273701 A1 | 9/2014 | Samanta et al. |
| 2014/0287641 A1 † | 9/2014 | Steiner, III |
| 2014/0318069 A1 † | 10/2014 | Moennig |

FOREIGN PATENT DOCUMENTS

| | | |
|---|---|---|
| EP | 2 402 150 A1 | 1/2012 |
| WO | 2010/046074 A1 | 4/2010 |
| WO | 2010/126792 A1 | 11/2010 |

OTHER PUBLICATIONS

International Search Report dated Feb. 24, 2016, in PCT/FR2015/053490, filed Dec. 14, 2015.
First Office Action dated Nov. 6, 2018, in Chinese Application No. 201580068561.8 dated Dec. 14, 2015 (English translation only).
Second Office Action dated Jul. 12, 2019, in Chinese Application No. 201580068561.8 dated Dec. 14, 2015 (English translation only).

* cited by examiner
† cited by third party

*Primary Examiner* — Sheeba Ahmed
(74) *Attorney, Agent, or Firm* — Element IP, PLC

(57) ABSTRACT

The invention relates to an insulation product formed from at least two insulating layers containing aerogels, each of said layers comprising from 25 to 95 wt % of aerogel(s) and from 5 to 75 wt % of fibers, said insulating layers being joined together by means of an organic adhesive, advantageously aqueous, based on vinyl polymer(s).
The invention also relates to a method for obtaining said product.

14 Claims, No Drawings

HIGH-PERFORMANCE THERMAL INSULATION PRODUCTS

The present invention relates to a high-performance thermal insulation product, the method of manufacture thereof, and the use thereof in the construction field, for example in the new-build market or in renovation for insulating the walls of buildings, or for insulating wooden floors, ceilings, patios, exterior walls, or even pipes, etc., this insulating material in particular being in the form of panels or strips.

Whether we are discussing the new-build market or renovation, there is always a considerable demand for high-performance, in particular thermal, insulation products. There is a constant demand for products offering enhanced insulation properties and complying with the exacting specifications of building works. It is also advantageous, in this quest for materials offering better thermal insulation, if said materials also display, or even improve, other required properties in building construction, in particular with respect to mechanical strength or fire resistance, sound insulation, etc.

A great variety of thermal insulating materials is known at present. Among the commonest products, we may mention fibrous insulating materials, based on natural or synthetic fibers, such as glass wool or rock wool, cellular insulating materials of the expanded polymer type such as expanded or extruded polystyrene, or phenolic or polyurethane foams. The thermal performance of essentially mineral insulating materials is reflected in values of thermal conductivity λ that are commonly above 32-35 mW/m·K, in particular of the order of 40 mW/m·K, values which may be lower in the case of essentially organic insulating materials, for example in the case of cellular insulating materials incorporating a gas of lower thermal conductivity than air to improve the thermal performance. However, a drawback of these materials is the difficulty of keeping the gas within the matrix over time, because as the material ages it loses some of this thermal performance. Furthermore, for organic insulating materials, reaction to fire is poor owing to their nature.

It is also possible to employ materials in which a vacuum has been created so as to form vacuum panels, for example. These insulating materials are difficult to use as they cannot be cut or perforated, and they may suffer a gradual loss of vacuum in the long term.

Aerogels are another known form of insulating materials, generally in the form of translucent granules or fine powder, having particularly high performance in terms of thermal insulation, but whose poor mechanical properties require them to be used with protection or reinforcement, or aerogels in mats (or layers) formed from entangled fibers (mechanically strong) for which it may be difficult to impart a defined shape. These aerogels are difficult and expensive to obtain on an industrial scale, they require exacting drying conditions, and combining them with other insulating materials to obtain adequate mechanical durability or a suitable shape may be complex. It is, moreover, necessary to limit the rate of organic components present (generally resulting from the method of synthesis of the aerogels and/or derived from the additives incorporated in these insulating materials during manufacture) in aerogel-based products used for thermal insulation of buildings on account of the fire resistance properties usually required for these applications.

In particular, aerogel-based insulating materials include mats (or blankets or layers) of fibers (inorganic and/or organic), several millimeters in thickness, that have been impregnated with chemical reagents serving for production of the aerogel, the aerogel being synthesized between the fibers of the mats, thus giving an intimately bonded structure. The mats are generally packaged rolled up, but manipulation is generally difficult, as the mats, being very dusty and generally remaining fragile, are not suitable for use in building. As these mats are also dense (for example of the order of 150 kg/m³), assembling them with other layers, in particular similar layers, is still problematic, as attaching has to be efficient, easy to carry out on an industrial scale, and must not be detrimental to the good insulation properties of the material conferred by the aerogels (and in particular must not lead to an increase in the values of thermal conductivity), or to other required properties (such as fire resistance for building applications).

The present invention has endeavored to develop a novel high-performance thermal insulation product that does not have the aforementioned drawbacks, in particular a product displaying very good properties of thermal insulation as well as good mechanical strength, easy to produce and manipulate, this product also having good resistance to aging and good fire resistance.

This aim has been achieved with the insulation product according to the invention, said product being formed from at least two (thermally) insulating layers, in particular in the form of mats containing aerogels, each of said layers comprising (or being formed from) 25 to 95% (in particular from 40 to 50%) by weight of aerogel(s) (preferably inorganic) and from 5 to 75% (in particular from 20 to 40%) by weight of fibers, preferably (to at least 50 wt %, and advantageously up to 100 wt %, among them) inorganic (in particular of glass or rock fibers), said insulating layers being joined (together or with one another) by means of an organic adhesive, advantageously aqueous (initially, before the adhesive dries, the water then being removed from the adhesive), based on vinyl polymer(s). The insulation product according to the invention advantageously has a superior calorific power (PCS) below 3 MJ/kg (PCS being evaluated for 1 kg of product as stated hereunder) and a tensile (breaking) strength (or resistance to traction) above 1 kPa.

According to an advantageous embodiment of the invention, the organic adhesive used for joining (or attaching) together the insulating layers of the product according to the invention has a PCS (per 1 kg of adhesive) below 24 MJ/kg and/or the contribution of said adhesive to the PCS of the product (or relative PCS (or PCSr) of the adhesive in the product, corresponding to the PCS of the adhesive (per 1 kg of adhesive) multiplied by the rate of adhesive by weight in the product, where the product may comprise one or more layers (continuous or discontinuous) of adhesive, depending in particular on the number of insulating layers to be bound together) is lower than the difference between the maximum value of the PCS of the insulation product according to the invention (equal to 3 MJ/kg) and the value of the PCS of the assembly formed by the insulating layers not yet provided with adhesive, in particular is lower than 0.7 MJ/kg, each insulating layer, as well as the assembly formed by the insulating layers not yet provided with adhesive moreover having a PCS (per one kg of said layer or layers) less than or equal to about 2.3 MJ/kg (in particular strictly below 2.35 MJ/kg, and preferably less than or equal to 2.3 MJ/kg).

According to the invention, the organic adhesive used for joining the insulating layers of the insulation product according to the invention is advantageously an (initially) aqueous adhesive (formed from component(s) in an aqueous solvent (or water optionally containing additives)), this adhesive advantageously providing adhesion by evaporation of water vapor (at room temperature or by drying if necessary), said adhesive moreover being based advantageously on vinyl polymer(s) (in an aqueous solvent), said polymer(s) providing the adhesion.

The thermal insulating product according to the invention is particularly advantageous: besides good thermal performance, it displays fire resistance, improved mechanical strength and durability, while remaining, if applicable, simple to manufacture (starting from aerogel mats that are stacked and glued, the adhesive advantageously acting by evaporation) and offering improved manipulation (more convenient for installation in particular). Advantageously, it has fire resistance of class A2 according to standard EN 13501-1, despite the presence of an organic adhesive, and its thermal conductivity is below 25 mW/m·K, preferably below 22 mW/m·K, or even below 18 mW/m·K, or below 15 mW/m·K.

This thermal insulation product according to the invention is thus a multilayer composite/formed from a layered structure, comprising at least two (thermally) insulating layers based on aerogels, bound together by an adhesive, in particular by at least one organic compound or adhesive or glue or bonding agent.

"Organic adhesive" means an adhesive (or a composition having tackiness, said tackiness being evaluated in particular from the tensile strength measured on the product formed from layers glued together (perpendicularly to the plane of the layers according to standard NF EN 1607)) based on at least one organic compound providing the adhesion (or adhesive agent), the rate of organic compound(s) present (including that or those providing the adhesion and if applicable other organic compound(s) optionally present) in the adhesive, relative to all of the compounds present when dry (or relative to the dry extract), advantageously being at least 50%, preferably at least 75%, in particular at least 90% or even 100%, by weight. Advantageously in the present invention, the adhesive comprises as adhesive agent(s) essentially (to at least 50 wt % of the rate of adhesive agent(s) present, in particular at least 75% and advantageously at least 90%), and preferably only, one or more vinyl polymers selected in particular from the polyvinyl acetate homopolymers (PVAC) or the polyvinyl acetate copolymers (in particular with maleates, ethylene, or acrylates, etc.), these polymers providing the adhesion and generally being (initially) dispersed (as emulsion or suspension in particular) in the adhesive in the aqueous medium (or water) mentioned above, the aqueous medium (water) then generally being removed by evaporation during drying (at or above room temperature) of the product, thus allowing the polymers to provide the required adhesion. The dry extract of the adhesive (rate remaining after evaporation of the solvent) is generally between 40 and 60 wt %.

The superior calorific power or gross calorific value (PCS) of a product or material is considered to be the thermal energy released by the combustion of one kilogram of said product or material. The PCS is measured in particular in the present invention according to standard EN 13501, by performing measurement on each type of component of the insulation product, in particular by performing the measurement on each type of insulating layer ($PCS_M$) of the composite according to the invention and on the adhesive used (PCSc), the PCS of the complete thermal insulation product being obtained by simple calculation by finding the sum of the PCS values of the different components weighted according to their proportions by weight in the complete product (for example, for a product formed from several identical aerogel mats of total weight $m_M$ glued together with an adhesive whose weight in the complete product is $m_c$: $PCS_{(product)} = (PCS_M \times m_M + PCSc \times m_c)/(m_M + m_c)$. The PCS of the product according to the invention is in particular below 3 MJ/kg, thus allowing it to retain a class A2 fire classification.

For measurement of the tensile strength (evaluated perpendicularly to the plane of the insulating layers according to standard NF EN 1607), the test in the present invention consists in particular of applying stress on two of the insulating layers forming the product, these layers having been glued by a layer of the adhesive used, the adhesive being applied in a continuous layer and having been dried at room temperature for a time that may be up to several days until constant weight is obtained. The two insulating layers each having been made integral, or having been joined, with a wooden panel beforehand by gluing using a suitable adhesive with tackiness greater than that of the adhesive used for gluing the insulating layers together, the tensile force is applied to the two wooden panels to separate the two layers.

The (thermally) insulating layers forming the structure of the insulation product according to the invention are advantageously fibrous layers/layers formed from fibers, in particular of the mat type (or mats or layers formed from entangled fibers (in particular threads and/or filaments)), forming a porous or "discontinuous" structure), containing aerogels (or aerogel). Each fibrous layer may be formed in a known manner, for example by depositing fibers, obtained from a die or some other fiber-forming device (in particular obtained by centrifugation and then drawn out), on a mat and optionally joining the fibers together by mechanical attachment, in particular by needling, or by chemical bonding by means of a binder applied on the fibers. The aerogels may be integrated with the fibers in various ways, either by impregnation of the fibrous layers in or by means of a solution for forming the aerogels in situ or by mixing with preformed aerogels. Preferably, the fibrous layers are impregnated with (a solution containing) the reactants for obtaining the aerogels, extraction of the liquid and gelation being carried out (in particular in supercritical conditions) in order to obtain insulating layers containing aerogels.

Each fibrous layer may be formed from different types of fibers. Preferably, a majority (at least 50 wt %, in particular at least 75 wt % or at least 80 wt % of the fibers), or even advantageously all the fibers of each layer, are inorganic/mineral fibers, and these fibers may in particular be selected from glass fibers (or glass wool), rock fibers (or rock wool), ceramic fibers, basalt fibers, etc., and are preferably glass fibers. If necessary, it is possible to have a small proportion (in particular less than 20 wt %, or less than 10 wt %, of the fibers) of organic fibers (such as fibers of polyethylene, polypropylene, polyacrylonitrile, polyamide, aramid, polyester, polylactic acid, polyethylene terephthalate (PET), etc.). Preferably, the fibers forming the fibrous layers are glass fibers, for example of glass E or of glass C, or rock fibers.

The fibrous layer may if necessary also comprise a binder, at a rate generally below 7 wt % of dry matter relative to the layer, this binder if necessary allowing the fibers to be bound together, and in particular being water-based, and this binder may if necessary comprise various organic or inorganic compounds (resin(s), additive(s), etc.).

The fibrous layers forming the insulating layers according to the invention are advantageously porous and can breathe, i.e. they are permeable to diffusion of water vapor and air. They advantageously (each) have a voluminal mass (or density) between 8 and 90 kg/m³, in particular of the order of 10 to 60 kg/m$^3$. Their thickness, for each fibrous layer, is in particular between 6 and 20 mm, in particular between 8 and 15 mm.

Preferably, according to the invention, the fibrous layers forming the insulating layers of the product are mats based (predominantly, to at least 80 wt % of the fibers) on fibers of glass E or C (and optionally comprising, to less than 20 wt % of the fibers, organic fibers of the PET type), of about 10-15 mm of the thickness that has been impregnated with the chemical reagents serving for production of the aerogel to obtain insulating layers based on aerogel(s) according to the invention.

The aerogels used for obtaining the insulating layers according to the invention are advantageously inorganic aerogels, in particular based on oxides, such as aerogels based on silica, aluminum and/or titanium. Preferably, the product according to the invention comprises at least one silica aerogel as aerogel(s), and preferably comprises essentially (to at least 50%, and preferably to 100%, by weight of the aerogels) or only silica aerogels. The rate of aerogels in the product according to the invention is generally between 40 and 50 wt % of said product.

The aerogels are generally obtained from a gel, manufactured for example by hydrolysis in the presence of a solvent and then gelation with catalysis starting from a precursor and then by evaporation or extraction of the liquid forming the gel (for example in supercritical or subcritical conditions) in order to replace said liquid with a gas (in particular air) without the porous structure collapsing. The aerogels thus formed are highly porous materials, with open pores, and with nanometric pore size.

Preferably, according to the invention, the aerogels are produced by impregnating the aforementioned fibrous layers with a solution containing the reactants for forming said aerogels as indicated above. The layers, or mats, of aerogels (reinforced by fibers) thus produced are for example marketed under the reference Spaceloft® or Cryogel by the company Aspen Aerogel Inc. The aerogels may also be manufactured independently of the fibrous layers and then mixed with said layers to obtain the insulating layers.

As the aerogel mats are generally available in small thicknesses owing to the production process and the need for supercritical drying, when used separately they do not give satisfactory insulation. The present invention makes it possible, by combining them in particular with a suitably selected adhesive that does not cause significant deterioration of the thermal performance of the assembly, to obtain all of the properties required, in particular thermal and mechanical.

The aerogel mats used advantageously have a PCS less than or equal to about 2.3 MJ/kg, as stated above, i.e. the intermediate formed from the layers of aerogels not glued together has a PCS less than or equal to about 2.3 MJ per kilogram of said intermediate/of the assembly of layers not glued together. The aerogels themselves are advantageously formulated and manufactured (by supercritical drying of a hydrophobic alcogel) so that they intrinsically have a low PCS.

The composite thermal insulation product according to the invention is formed in particular from the stack of the aforementioned insulating layers. It comprises at least two of said insulating layers, advantageously at least three, in particular four or at least four (in particular when said layers have a thickness of less than 10-15 mm) of said insulating layers of aerogels as mentioned above, each layer being in the form of a mat as mentioned above, each of the insulating layers of the stack advantageously being essentially inorganic. Each insulating layer contains aerogels and fibers as mentioned above, and may also contain other inorganic fillers and/or one or more additives, at rates for example less than 10 wt %, in particular when one or more properties and/or functions are required (presence for example of an infrared opacifier, of graphite, of calcium silicate, etc.), and/or may comprise (as already mentioned) one or more binders and/or oils and/or silicones, etc. An opacifier (such as carbon black, graphite, or an oxide such as titanium dioxide $TiO_2$, etc.) may also be added to the aerogels, during their manufacture or on the particles obtained.

The adhesive comprises, besides the adhesive agent or agents, advantageously water (aqueous medium) and may also comprise if necessary one or more soluble or insoluble additives, at rates below 20 wt % of the dry extract, such as dispersants, rheology modifiers, plasticizers, mineral fillers (such as calcium carbonates), etc. Preferably, the adhesive composition comprises at least one plasticizer that acts in particular on the rheology of the adhesive.

The adhesive selected makes it possible to glue the aerogel mats together whatever aerogels and fibers are used. It may be deposited continuously (for example by roller), or advantageously in islands by spot gluing, in particular in lines (threads) or points (drops) of adhesive on the surface of one or other of the fibrous layers to be glued together.

Advantageously, the product according to the invention comprises mainly, or even only, layers with essentially a mineral base (apart from the adhesive as defined and if applicable binder(s) and/or additive(s) and/or optional organic fibers as already mentioned, etc.). Organic layers (other than the adhesive) may in particular be tolerated if they contain fireproofing additives or are otherwise fire-resistant.

In an advantageous embodiment, illustrated hereunder, in which the product comprises four insulating layers with a thickness of the order of 10 mm, the insulating layers being joined by adding an organic adhesive based on vinyl polymers (in an aqueous medium) as organic adhesive component(s) (or bonding agent(s) or adhesive agent(s)), the rate of adhesive agent(s)/of vinyl polymer(s) (dry), deposited between two insulating layers is preferably less than or equal to 120 g/m$^2$ (g of adhesive agent(s) per m$^2$ of glued surface), advantageously less than or equal to 80 g/m$^2$, so that the PCS of the insulation product is below 3 MJ/kg, the adhesive advantageously having a PCS below 24 MJ/kg, as already noted above.

The layers are joined together with bonds, which may or may not be localized, in particular with bonds at various specified places of the product (for example on the edges or at regular intervals along the length of the product) for better insulation properties and to avoid thermal bridges, and if applicable to maintain a certain flexibility of the product.

The insulation product according to the invention is preferably of limited thickness, its thickness not exceeding 100 mm, and advantageously being below 60 mm. The thickness of each insulating or fibrous layer is generally less than about 15-20 mm, in particular less than about 13 mm.

The insulation product according to the invention is generally in (semi-) rigid form and may be fixed on or around the surfaces or products to be insulated by various means (gluing, stapling, screw-fixing, etc.).

Use of the organic adhesive as defined above in the insulating structure according to the invention makes it possible to obtain the advantageous product according to the invention but without having an adverse effect on the required properties of fire resistance or thermal insulation. Conventionally and as already mentioned, organic components are problematic in terms of fire behavior, which makes them undesirable for certain applications where high fire resistance (in particular class A2 resistance) is required (in particular in buildings). Surprisingly, the product according to the invention has fire resistance of class A2, despite the presence of the selected organic adhesive, which means it can be used as insulating material for various buildings such as high-rise buildings. The product according to the invention also has high tensile strength and high long-term mechanical stability, as already mentioned.

The thermal performance of the insulating material according to the invention is reflected in particular in values of thermal conductivity $\lambda$ advantageously below 25 mW/m·K, and preferably below about 22 mW/m·K, in particular below 18 mW/m·K, the change in thermal conductivity due to the adhesive being at most under 1 mW/m·K relative to the unglued stack, as illustrated hereunder. The thermal conductivity $\lambda$ (in W/m·K) represents the amount of heat passing through the insulating material (one meter thick, per $m^2$ and when the temperature difference between the two faces is 1° K). The values of thermal conductivity $\lambda$ (compared at identical pressure and temperature, in particular at atmospheric pressure (1 bar) and room temperature (between 10 and 25° C.) are measured by the fluxmetric method on the model in particular of standard IEEE 442-1981 (IEEE guide for soil thermal resistivity measurements, ISBN 0-7381-0794-8).

The thermal insulation composite product according to the invention has a PCS of less than 3 MJ per kilogram (of composite) and preferably below 2.8 MJ per kg. Moreover, the PCS of the organic adhesive is advantageously below 24 MJ per kg (of adhesive) and preferably below 23.5 MJ/kg.

The product according to the invention offers a good compromise in terms of thermal conductivity, tensile strength, and fire resistance, and complies with the requirements on hygiene and safety, compared to other assemblies of aerogel mats made with other types of adhesives, such as inorganic adhesives based on silicates, or adhesives based on organic solvents, which do not allow all of the required characteristics to be obtained, as illustrated hereunder.

The invention also relates to a method for obtaining an insulation product according to the invention, said method comprising at least one step of gluing at least two insulating layers, in the form of mats containing aerogels, in particular each of said layers comprising from 25 to 95 wt % of aerogel and from 5 to 75 wt % of fibers (in particular inorganic), said gluing being carried out by means of an organic adhesive, advantageously aqueous, based on vinyl polymer(s). The insulation product obtained advantageously has a superior calorific power below 3 MJ/kg and a tensile strength above 1 kPa, as indicated above.

In the above method, the layers forming the product are placed on one another and joined together so that finally an assembly or panel less than 100 mm thick is obtained, which may if necessary be surfaced, for example with a glass film, in particular to limit dust, and/or may be covered on its edge or edges with adhesive tape, for example of aluminum, for the same reason.

Once the layers of aerogel(s) have been coated with the organic glue (or adhesive or adhesive component), each layer is stacked on another, and the edges are aligned in such a way that all the layers create a geometric shape with straight edges (for example a rectangle).

As already stated above, the adhesive may be applied in various ways (by spraying, direct application, etc.), at a rate in particular between 5 and 120 g, in particular between 10 and 80 g, of the adhesive component (dry) per $m^2$ of bonded layer. If necessary, weights may optionally be applied on the surface of the layers for better contact during gluing.

The insulation product is then dried (and the water in the adhesive is removed), either by drying at room temperature (allowing the water to evaporate) or by heating (for example in a drying oven between 30 and 115° C.), where the drying temperature and time may vary depending on the number of layers of aerogels, the amount and the solids content of the adhesive and the geometry of the product.

The method may also comprise a step of finishing and packaging, and/or a step of cutting. It is in particular possible to trim the edges of the insulation product after assembly of the layers or to cut the layers containing the aerogels to the required dimensions. A coating material may if required be applied on the surface in order to protect the product or reinforce it, for example a film, adhesive tape, a coating, etc.

The present invention and its advantages will be better understood on reading the examples given hereunder, given only for purposes of illustration and which in no case are to be regarded as limiting.

In each of these examples, a product was formed starting from four aerogel mats (insulating layers) with the reference Spaceloft® A2 marketed by the company Aspen Aerogel Inc., each of 600×600 $mm^2$ (or of 200×200 $mm^2$ for performing the tensile strength tests) and each 10 mm thick, these four mats being stacked on one another, each mat comprising silica aerogels and having a density of 200 $g/m^2$. The product had a thickness of the order of 40 mm.

In the first comparative example (reference example 1), not according to the invention, the insulation product was only formed from the aforementioned four layers, stacked but not glued.

In the second comparative example (reference example 2), not according to the invention, each mat was glued using an organic adhesive in an organic solvent ($CH_2Cl_2$) based on rosin, marketed under the reference Swiftcoll 4035 by the company HB Fuller, this adhesive comprising 32 wt % of rosin adhesive components in the adhesive composition.

In the third comparative example (reference example 3), not according to the invention, each mat was glued using an aqueous inorganic adhesive based on sodium silicates, marketed under the reference Acrobond M25S by the company AS Technology, this adhesive comprising 49 wt % of vinyl acetate adhesive components in the adhesive composition.

In the last example, this time illustrating the present invention, each mat was glued using an aqueous organic adhesive based on vinyl acetate copolymers and a plasticizer, marketed under the reference Tarbicol DB56E1 by the company Bostik, this adhesive comprising 53 wt % of vinyl acetate adhesive components in the adhesive composition.

In the examples with gluing, the adhesive was applied in a continuous layer using a brush. The panels were dried under a hood or in a drying oven at 110° C. for a period of from 1 h to several days depending on the drying rate of the adhesive used.

The thermal conductivity was measured according to the principle of the fluxmetric method at a temperature of 10° C. and at atmospheric pressure, the precision of the measurements being estimated at 5%. For performing this test, it was decided to use an amount of adhesive of 100 $g/m^2$ (of layer coated).

For measurement of tensile strength, the test consisted of applying a stress to two of the mats glued with a layer of adhesive. The two mats were attached beforehand to two wooden panels, on which the tensile force was applied for separating the two mats. For performing this test, it was decided to use an amount of adhesive of 120 $g/m^2$ (dry adhesive). The layer of adhesive was applied in a continuous layer in the same conditions as those described for preparing the 600×600 mm² panels. Three identical samples were prepared for each type of adhesive.

The superior calorific power (PCS) for 50 g of sample and for an amount of adhesive of 75 g/m² was measured on one of the Spaceloft® A2 reference mats and then on each of the adhesives. A simple calculation gave the PCS of the complete composite depending on the amount of adhesive applied, said PCS having to be under 3 MJ/kg, in particular to maintain the A2 fire classification.

Reference Example 1

The following results were obtained:
thermal conductivity λ=19.8 mW/m·K
PCS of the product=2.3 MJ/kg Reference Example 2

The following results were obtained:
change in thermal conductivity $\lambda_{after\ gluing} - \lambda_{before\ gluing} = 1$ mW/m·K
tensile strength: 4 kPa
PCS of the adhesive=37.9 MJ/kg
PCS of the product=3.3 MJ/kg Reference Example 3

The following results were obtained:
change in thermal conductivity $\lambda_{after\ gluing} - \lambda_{before\ gluing} = 0.8$ mW/m·K
tensile strength: 0.6 kPa
PCS of the adhesive=0 MJ/kg (incombustible)
PCS of the product=2.3 MJ/kg Example According to the Invention The following results were obtained:
change in thermal conductivity $\lambda_{after\ gluing} - \lambda_{before\ gluing} = 0.8$ mW/m·K
tensile strength: at least 2.3 kPa
PCS of the adhesive=23 MJ/kg
PCS of the product=2.9 MJ/kg The results obtained show that the product according to the invention gives the best compromise in terms of thermal conductivity, tensile strength, and fire resistance, compared to other assemblies of aerogel mats made with other types of adhesives, which do not allow all of the required characteristics to be obtained.

In fact, for the thermal conductivity, the change in thermal conductivity is significant starting from 1 mW/m·K, the organic adhesive in the organic solvent of reference example 2 being detrimental to the required properties of thermal insulation. For the tensile strength, the inorganic adhesive according to reference example 3 displays insufficient adhesion, making it unsuitable for use in most building applications intended for the required insulation product, where the tensile strength must be above 1 kPa. For the PCS of the composite, the organic adhesive in organic solvent of reference example 2 degrades the fire resistance properties of the product obtained, as the PCS of the product obtained exceeds 3 MJ/kg. Moreover, the adhesive in the example according to the invention can be applied easily, easily forming a thread of adhesive that does not break, in contrast to what was observed with the other two adhesives.

The product is in particular suitable for insulation of buildings, for example for insulating interior or exterior walls (said product being suitable in particular for application on the inner faces of exterior walls of buildings), or for insulating wooden floors, ceilings, patios, etc., but may also be used advantageously for thermal, or even acoustic, insulation of any other surface (for example of containers, etc.).

The invention claimed is:

1. An insulation product, formed from at least two insulating layers comprising aerogels, each of said layers comprising from 25 to 95 wt % of at least one aerogel and from 5 to 75 wt % of at least one fiber, said insulating layers being joined together by an organic adhesive based on vinyl polymer(s),
   wherein said insulating product has a calorific power PCS below 3 MJ/kg and a tensile strength above 1 kPa.

2. The insulation product of claim 1, wherein the organic adhesive comprises one or more vinyl polymers selected from the group consisting of a polyvinyl acetate homopolymer and a polyvinyl acetate copolymer, said polymers providing adhesion and initially being dispersed in an aqueous medium in the organic adhesive.

3. The insulation product of claim 1, wherein the organic adhesive has a PCS below 24 MJ/kg and/or a contribution of the organic adhesive to the PCS of the insulation product is less than a difference between a maximum value of the PCS of the insulation product and a value of the PCS of an assembly formed by the insulating layers not provided with adhesive.

4. The insulation product of claim 1, wherein the insulating layers are fibrous layers comprising the at least one aerogel.

5. The insulation product of claim 1, wherein each insulating layer has a PCS less than or equal to about 2.3 MJ/kg.

6. The insulation product of claim 1, comprising at least two insulating layers, wherein a rate of organic adhesive agent(s) between the two insulating layers is less than or equal to 120 g/m².

7. The insulation product of claim 1, wherein the organic adhesive comprises at least one plasticizer.

8. A method for obtaining an insulation product, the method comprising at least one step of gluing at least two insulating layers comprising aerogels, each of said layers comprising from 25 to 95 wt % of at least one aerogel and from 5 to 75 wt % of at least one fiber, wherein said gluing is carried with an organic adhesive based on vinyl polymer(s), and
   wherein the insulation product has a calorific power PCS below 3 MJ/kg and a tensile strength above 1 kPa.

9. The insulation product of claim 1, wherein the organic adhesive is an aqueous organic adhesive.

10. The insulation product of claim 1, wherein a dry extract of the organic adhesive is between 40 and 60 wt %.

11. The insulation product of claim 2, wherein a rate of the one or more vinyl polymers, relative to a rate of adhesive agent(s) present in the organic adhesive, is at least 50%.

12. The insulation product of claim 2, wherein a rate of the one or more vinyl polymers, relative to a rate of adhesive agent(s) present in the organic adhesive, is at least 75%.

13. The insulation product of claim 1, wherein the organic adhesive has a PCS below 24 MJ/kg and/or a contribution of the organic adhesive to the PCS of the insulation product is below 0.7 MJ/kg.

14. The insulation product of claim 1, wherein the insulating layers are fibrous layers comprising the at least one aerogel, said fibrous layers being mats based on E or C glass fibers.

\* \* \* \* \*